Patented Oct. 9, 1934

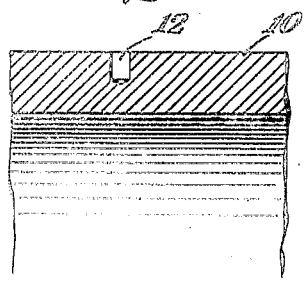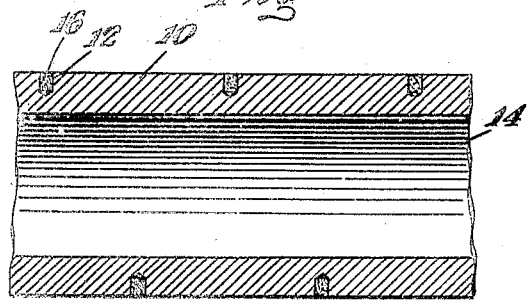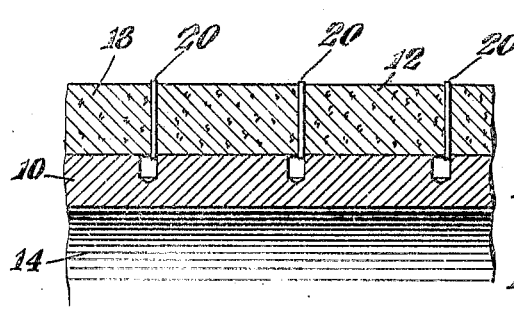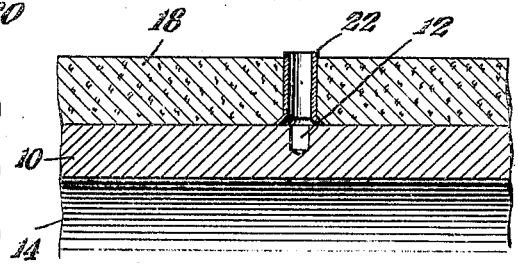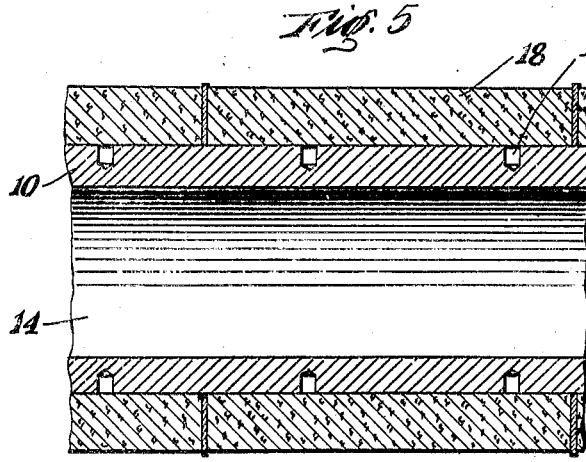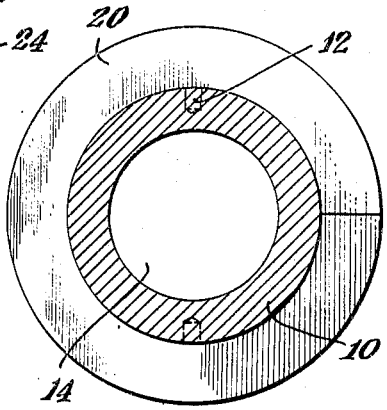

1,975,832

UNITED STATES PATENT OFFICE 1,975,832

CONDUIT

Luis de Florez, Pomfret, Conn.

Application September 3, 1931, Serial No. 560,952

4 Claims. (Cl. 137—75)

This invention relates to method and means for anticipating the failure of fluid conduits due to diminution of the wall thickness thereof in service. The invention is concerned generally with the treatment of conduits carrying fluids under severe conditions of stress, such as high pressures and/or temperatures, whereby the danger incident to the failure of such conduits is minimized. More particularly the invention is directed to pipes and tubes, for use in oil refineries, of such a character that a reliable and readily observable indication of impending failure of such equipment is available.

The refining of petroleum involves an exceedingly large amount of fluid transportation through conduits in which the flowing fluid is under high pressure or high temperature or both. The inflammable character of the oil presents a fire hazard of high degree which necessitates unusual precaution in the handling and transportation thereof. Experience has demonstrated that a majority of the accidents involving destruction of life and property by fire in oil refineries has been due to the unexpected failure of conduit walls due to an excessive diminution of the wall thickness.

The diminution of wall thickness during service in conduits for carrying petroleum through the various stages of refining may be caused by corrosion or erosion of the inner surface of the walls. It may also result from overheating causing distortion of the walls in the case of conduits exposed to high temperatures. The latter is a potent source of danger in the case of such special service conduits as cracking still tubes and the like which are subjected to direct or indirect heating in a furnace. The high temperature to which the metal of the tube is subjected under such conditions materially weakens its strength and, in conjunction with the pressure of the oil passing through the tubes, may induce a distortion of the walls. The diminishing of the wall thickness due to such distortion will eventually result in a failure of the tube with frequent serious consequences to operators and to adjacent equipment.

Prior to the invention disclosed in my copending application Serial No. 523,825, filed March 19, 1931, no reliable method was available whereby the failure of such fluid conduits could be anticipated. Periodic interruption of operation and inspection of equipment is the general practice in oil refineries but such procedure is but partially successful in coping with the problem. The corrosive and erosive action of fluids is not regular either as to location, rate, or degree, and the same is true of the distortion of metal under the influence of heat and pressure. Countless unforseen breakdowns in oil refineries have demonstrated that periodic inspection of the lines during scheduled shut-downs is not a dependable safeguard against the danger of failure during operation. Cracking still tubes have many times appeared perfectly sound at an inspection period and then failed shortly after being put back into service. The great necessity of preventing failure of conduits in service therefore gives the present invention unusual utility and commercial importance.

In my above-mentioned application I have described a method of anticipating the failure of receptacle walls due to corrosion and/or erosion of the inner surfaces thereof which consisted in inducing a localized failure of the wall well in advance of the general failure of the entire receptacle. The localized failure is free from the dangers incident to a general failure and at the same time serves as an unmistakable indication of impending general failure by reason of the fluid efflux from the receptacle wall. In order to induce such localized failure, the wall is provided with a plurality of openings extending partially through the wall from the outer surface thereof. The diminution of the wall thickness due to corrosion and/or erosion will eventually cause small apertures to form at the base of the said openings permitting a thin trickle of fluid to pass through the wall while the wall as a whole is still strong enough to resist the tendency toward general failure. The observation of such fluid efflux from the wall is then a reliable indication of the impending general failure of the receptacle and the danger of such failure may thus be averted.

As disclosed in my said copending application, the invention may be safely and practicably applied to conduits carrying fluids under high pressures and/or temperatures such as are met with in the refining of petroleum. A particularly advantageous field is conduits such as cracking still tubes which are subject to high pressure on the fluid side and to direct high temperature furnace gases or flames on the outer surface. In these conduits the danger of failure lies more in distortion of the metal walls due to localized overheating than in diminution of wall thickness by direct wear due to corrosion or erosion although the latter are frequently important factors. As previously noted, such distortion of tube wall cannot be anticipated either as to location, rate, or degree and consequently no method based upon periodic inspection of the tubes is dependable as a safeguard against the failure of the tube during service in a cracking still and the consequent fire hazard. The invention of my said application, however, makes it possible to minimize the hazard by providing a plurality of points at which localized pre-failure may occur to indicate impending general failure. An outstanding feature of the invention is its simplicity and safety which is quite apparent in the application to cracking still tubes. The character of the openings provided in the wall of the tube and extending partially therethrough is such as not to affect materially the overall strength of the tube. Consequently, a large number of such openings may be provided along the length of the tube in order to cover the maximum number of points at which distortion may occur and when pre-failure occurs the tube will still be strong enough to resist general failure even though localized failure occurs at more than one point.

The present invention embodies certain improvements upon the invention set forth in my co-pending application Serial No. 523,825 filed March 19, 1931.

It is desirable to avoid any further weakening of the walls at the openings by reason of the effect of the atmosphere in contact with the conduits. In many industrial plants and particularly in many phases of oil refinery practice, the atmosphere surrounding the conduits has an appreciable corrosive or oxidizing effect upon the metal. It will be apparent that if rust or scale is allowed to form in the openings, the thickness of the wall at the bottom of the openings may be unduly reduced and a localized failure may occur which will not be a true indication of the impending general failure of the conduit. If such conditions are not anticipated and guarded against the provision of the small openings in the outer surface of the conduit walls will not be a strictly dependable indicating means.

When the conduits under consideration are in the form of bare or uncovered pipes or tubes, a suitable protective material may be packed into the small openings in the pipe wall. This material should be of such character that the deleterious effect of atmospheric conditions is lessened while the flow of fluid from the opening at the time of aperture formation is not obstructed. Pipes or tubes which are not subjected to particularly high temperatures or to direct heat from the outside may have the small openings therein filled with a plastic material, such as tar, which will act as a protective agent for the metal with respect to the surrounding atmosphere and at the same time will have no undesirable chemical effect upon the metal itself. The tar or other material used must, of course, be of such a character that it will readily yield to the pressure of fluid emerging from the wall when an aperture is formed at the base of the small opening.

In the case of pipes or tubes which are subjected to high temperature gases, as for example cracking still tubes, or in the case of pipes which carry fluids at extremely high temperatures, the protective material which is used to fill the small openings may advantageously consist of a refractory cement. As is hereinbefore pointed out, the customary cause of failure in the case of tubes operating at high temperatures is the distortion of the metal due to overheating of the tubes. When such phenomena occur the enlarged diameter of the openings will cause the refractory cement to spall from the openings, thus permitting the free flow of fluid therefrom when an aperture is formed. In this connection, it is to be noted that the refractory cement selected must be of such a character that it will not form iron silicates or other deleterious compounds with the metal of the tubes.

In order to assure proper functioning of the small openings provided in the conduit walls, the fluid efflux from such openings must be immediately and quickly visible to an inspector. Consequently, when the conduits are to be covered with thermal insulating material, it is necessary to provide means for insuring the visibility of the fluid efflux resulting from localized pre-failure. As shown in the accompanying drawing, various methods may be used in solving this problem, as for example the insertion of small tubes through the insulating material to the outer pipe surface in such a manner as to permit a free flow of fluid from the wall. In the accompanying drawing, in which like reference characters denote like parts, Figure 1 is an enlarged fragmentary cross-sectional view of the conduit wall, showing one opening partially extending therethrough from the outside;

Figure 2 illustrates the application of the invention to uncovered pipes and the method of preventing undesirable scaling or oxidization of the metal in the small openings; and Figures 3, 4, 5 and 6 show respectively several methods of applying the invention to insulated or covered pipes.

Referring now to Figure 1, 10 is a section of the wall of a conduit shown in cross-section with an opening 12, partially extending through the wall to its outer side. The initial thickness of the wall is "$t$" and the depth of the opening is "$d$". The relation between these two factors will be determined largely by the judgment and experience of the designer, depending to some extent upon the necessary factor of safety for the conduit. The diameter of the small opening 12 is of such an order of magnitude as will permit the provision of a substantial number of such openings without impairment of the overall strength of the wall.

In the drawing, "$d$" is shown as about one-half of "$t$", but the invention is not limited to this particular ratio, since the relatively small cross-sectional area of the opening prevents the localized reduction in the factor of safety from materially changing the overall factor of safety of the conduit.

It will be noted that any circumstance which tends to diminish the wall thickness of the conduit will occasion a localized failure at the base of the opening 12, before a general failure of the conduit; when this occurs an aperture formed at 12 permits the escape of fluid from within the conduit directly through the wall at the point of failure and thus gives warning of the impending general failure of the conduit.

As indicated in Figure 1, the openings 12 may advantageously have a conical base. The initial size of the aperture formed by localized failure of the wall 10 at this point is thereby minimized, while still providing for a perceptible flow through the opening. In this way, impairment of the operating strength of the conduit due to the formation of the aperture is further guarded against. The initial flow through the opening in the wall will be very small, although sufficient to be observed, and necessary reinforcement or replacement measures may be taken immediately. It is to be understood, of course, that the invention is not limited to the particular form discussed above, but that the small openings 12 may have bases which are of any desired shape.

In Figure 2, the conduit 14, which may for example comprise a cracking still tube or a section of an uncovered transfer line, is provided with a plurality of small openings 12 extending partially through the wall 10 of the conduit from the outer side thereof. The openings 12 are initially filled with a protective material 16 for the purpose of preventing oxidation or corrosion in the opening. The material used will depend upon the service for which the pipe or tube 14 is intended. Tubes intended for the conveying fluids through the heating chambers of a furnace, as in a cracking still, may advantageously have the openings 12 filled with a refractory cement in order to prevent scaling at this point due to the effect of the flame and the furnace gases. If, upon the other hand, the pipe 14 is intended for service in the conveyance of unheated fluids and is not subjected to the influence of high temperature gases or furnace flames, the protective material 16 filling the openings 12 may comprise tar or similar substances which will not react with metal of the tube but will effectively prevent rusting or other action of the atmosphere on the metal.

In Figures 3, 4, 5 and 6 are shown conduits 14 having their outer surfaces covered with insulating material 18 and provided with openings 12 partially extending through the wall 10 of the conduit. In the case of such covered pipes, it is necessary to provide means for observing a fluid efflux from the wall 10 by reason of failure at a point 12. In the figures noted, three methods of accomplishing this are illustrated.

In Figure 3 the conduit 10 is shown provided with small wires 20 extending therefrom at the location of the openings 12. The wires are initially lightly fastened to the conduit wall and are of sufficient length to protrude from the outer surface of the thermal insulation 18 after the same has been placed upon the conduit. After the conduit has been so covered, the wires 20 may then be withdrawn and the small channels through the insulation thus formed will provide for the passage of fluid therethrough at a time of localized failure at 12. Alternately the covered conduit may be put into service without withdrawing the small wires 20, in which case the fluid emerging from the openings 12 will pass along the wires 20 and thus be observable at the outer surface of the insulation.

It is to be clearly understood that the modification illustrated in Figure 3 is not intended to be limited to the use of wires only. Analogous expedients may obviously be adapted to insure the visibility of fluid efflux from the openings 12 when the conduit 10 is covered with insulation 18. For example, the elements 20 in Figure 3 may comprise small channel shaped or longitudinally grooved bars of metal or other suitable material which will provide a fluid passageway through the covering 18. Therefore, the word "wires" as used in the specification and claims is intended to denote any element of the character described which may logically fall within the scope of the above definition.

In Figure 4, small cylindrical tubes 22 extend through the insulation at the location of the openings 12. Fluid passing through an aperture formed at 12 will then flow through the tube and be observable from the outer side of the insulation.

Figures 5 and 6 show still another method of insuring the visibility of a fluid efflux from the wall in the case of covered conduits. Annular rings 24 are placed along the pipe at regular intervals. The rings 24 are made of thin sheet metal serving to divide the insulation 18 into a plurality of tubular sections. The drawing shows thin rings 24 spaced along the pipe to include two openings 12 between adjacent rings, but the invention is not limited to this particular assembly and the rings 24 may advantageously be spaced along the pipe 10 to include more than two openings 12 between adjacent rings. If desired, the rings 24 may also be located between adjacent openings 12. Upon formation of an aperture at 12 the fluid passing through the wall will run along the outer surface of the wall 10 to the nearest annular ring or dividing plate and subsequently will spread over the surface of the plate 24 and become observable at the outer surface of the insulation.

Figure 6 is a sectional view of the conduit shown in Figure 5, taken through one of the dividing plates 24, and shows the general assembly.

I claim:

1. A conduit for conveying fluids under superatmospheric pressure and high temperature comprising a metal tube provided with a plurality of small openings extending partially through the tube wall from the outer side thereof adapted to form apertures permitting fluid flow directly through said wall upon diminution of the wall thickness in service, the cross-sectional area of said openings being small enough to permit a substantial number thereof in the wall without materially affecting its strength, thermal insulation covering the outer surface of said tube and means for insuring the visibility of the fluid flow from said apertures.

2. A conduit for conveying fluids under superatmospheric pressure and high temperature comprising a metal tube provided with a plurality of small openings extending partially through the tube wall from the outer side thereof adapted to form apertures permitting fluid flow directly through said wall upon diminution of the wall thickness in service, the cross-sectional area of said openings being small enough to permit a substantial number thereof in the wall without materially affecting its strength, thermal insulation covering the outer surface of said tube, and a plurality of small wires passing through said insulation, one end of each of said wires being located at one of the small openings in said tube wall and the opposite ends of said wires protruding from the outer surface of said insulation whereby the visibility of the fluid flow from the apertures is insured.

3. A conduit for conveying fluids under superatmospheric pressure and high temperature comprising a metal pipe provided with a plurality of small openings extending partially through the pipe wall from the outer side thereof adapted to form apertures permitting fluid flow directly through said wall upon diminution of the wall thickness in service, the cross-sectional area of said openings being small enough to permit a substantial number thereof in the wall without materially affecting its strength, thermal insulation covering the outer surface of said pipe, and a plurality of small tubes passing through said insulation, one end of each of said tubes being located at one of the small openings in said pipe wall and the opposite ends of said tubes protruding from the outer surface of said insulation whereby the visibility of the fluid flow from the apertures is insured.

4. A conduit for conveying fluids under superatmospheric pressure and high temperature comprising a metal pipe provided with a plurality of small openings extending partially through the pipe wall from the outer side thereof adapted to form apertures permitting fluid flow directly through said wall upon diminution of the wall thickness in service, the cross-sectional area of said openings being small enough to permit a substantial number thereof in the wall without materially affecting its strength, thermal insulation covering the outer surface of said pipe, and a plurality of thin sheet metal annular rings placed at intervals along said pipe whereby said thermal insulation is separated into a plurality of tubular sections and the visibility of the fluid flow from the apertures is insured.

LUIS DE FLOREZ.